No. 847,922. PATENTED MAR. 19, 1907.
E. R. ELDRIDGE.
MUSIC LEAF TURNER.
APPLICATION FILED SEPT. 18, 1906.
2 SHEETS—SHEET 2.
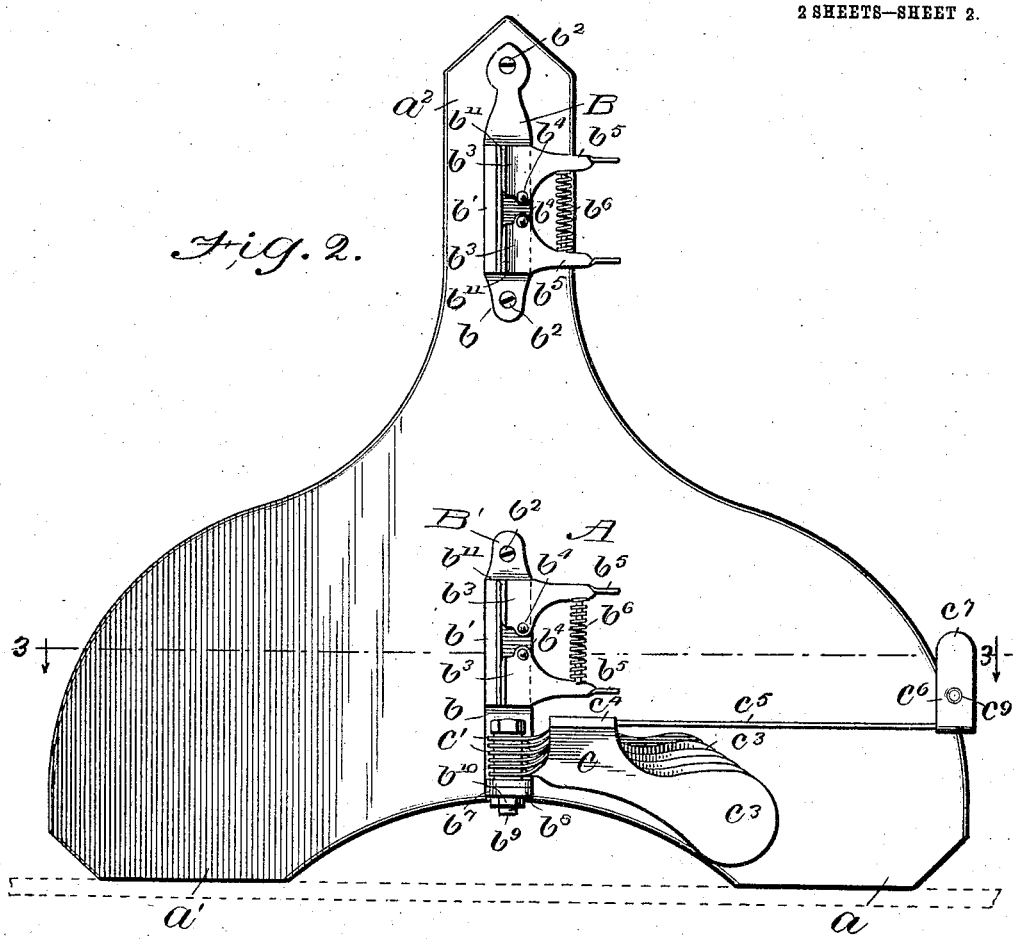
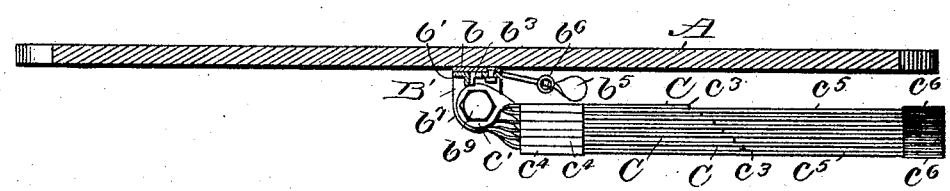
WITNESSES
F. C. Barry
C. E. Trainor
INVENTOR
ERNEST R. ELDRIDGE
BY Munn & Co.
ATTORNEYS

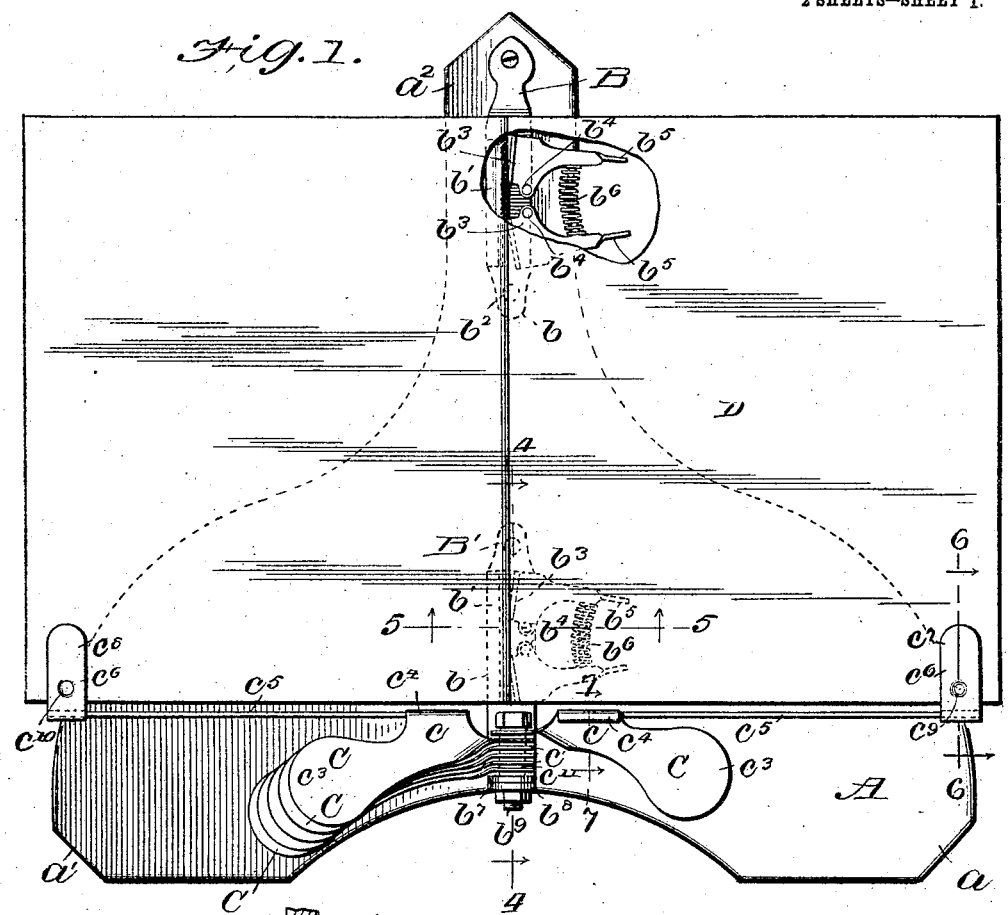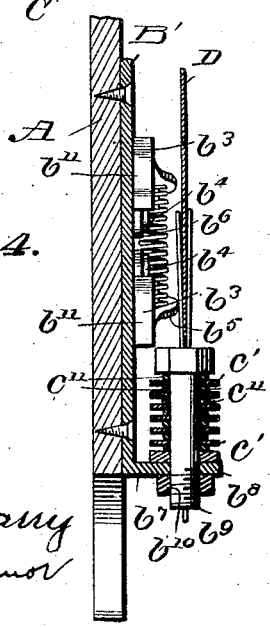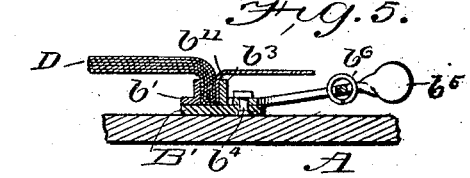

UNITED STATES PATENT OFFICE.

ERNEST R. ELDRIDGE, OF SUMTER, SOUTH CAROLINA.

MUSIC-LEAF TURNER.

No. 847,922.　　　Specification of Letters Patent.　　Patented March 19, 1907.

Application filed September 18, 1906. Serial No. 335,054.

*To all whom it may concern:*

Be it known that I, ERNEST R. ELDRIDGE, a citizen of the United States, and a resident of Sumter, in the county of Sumter and State of South Carolina, have made an Improvement in Music-Leaf Turners, of which the following is a specification.

My invention is an improvement in music-leaf turners, and consists in certain novel constructions and combinations of parts hereinafter described and claimed.

In the drawing, Figure 1 is a plan view of my improvement, showing the folio in place. Fig. 2 is a similar view with the folio removed. Fig. 3 is a section on the line 3 3 of Fig. 2 looking in the direction of the arrows. Fig. 4 is a section on the line 4 4 of Fig. 1 looking in the direction of the arrows. Fig. 5 is a section on the line 5 5 of Fig. 1 looking in the direction of the arrows. Fig. 6 is a section on the line 6 6 of Fig. 1 looking in the direction of the arrows, and Fig. 7 is a section on the line 7 7 of Fig. 1 looking in the direction of the arrows.

In the present embodiment of my invention I provide a support A, substantially trefoil in shape, the leaves $a\ a'$ forming a base for the support and the leaf $a^2$ supporting the upper part of the back of the folio D.

A plurality of clasps B B' are arranged in vertical alinement on the support, each of the clasps comprising a base $b$, secured to the support by screws $b^2$ and provided upon the upper surface thereof with a longitudinal rib $b'$, forming the fixed jaw of the clasp. Plates $b^3$ are arranged adjacent to each end of the longitudinal rib, the said plates being pivoted to the base, as at $b^4$, and each being provided with a rib $b^{11}$ for coöperating with the longitudinal rib of the base. It will be observed that the pivot $b^4$ is eccentric to the plate, so that when the said plate is rocked upon the pivot the rib $b^{11}$ will be separated from the rib $b'$. Each of the plates $b^3$ is provided with a handle $b^5$ for manipulating the same, and a spring $b^6$ is arranged between the handles, the spring acting normally to separate the handles, whereby to retain the ribs $b^{11}$ in contact with the rib $b'$. The lower clasp B' is extended, as at $b^7$, and the extension is provided with an angular portion $b^8$, having an opening to receive a bolt $b^9$ for a purpose to be hereafter described, the said bolt being secured to the angular portion by a nut $b^{10}$. The bolt $b^9$ coincides with the central vertical line of the support A, and upon the said bolt are pivoted the leaf-turning arms C.

Each of the leaf-turning arms C comprises a plate $c$, having at one end a lug $c'$, bent at right angles to the plate and provided with an opening for receiving the bolt $b^9$, washers $c^{11}$ being arranged between the adjacent lugs whereby to separate the plates from each other. Each plate is also provided with a finger-piece $c^3$ for convenience in manipulating the turning-arm, and a rod $c^5$ is secured to the plate in any suitable manner, as at $c^4$, the said rod projecting at right angles from the median vertical line of the support. Clamps $c^6$ are secured to the free ends of the rods, each of the clamps comprising a plate doubled upon itself to form coacting jaws $c^7$ $c^8$ for engaging the leaves of the folio, and one of said jaws $c^7$ is provided with a convex portion $c^9$, fitting into a concave portion $c^{10}$ on the adjacent jaw. The leaf of the folio is placed between the jaws $c^7\ c^8$, and the convex portion of the one jaw coacting with the concave portion of the other jaw maintains a secure grip upon the leaf, as shown in Fig. 6.

It will be noticed from an inspection of Fig. 7 that the inner end of the rod $c^5$ is square and that a lug $c^{12}$ of the plate $c$ is bent to fit this squared portion, whereby to prevent rotation of the rod, and that a similar means is provided for securing the plate forming the jaws $c^7\ c^8$ to the outer end of the rod.

In the operation of my invention the folio is placed upon the support with the back thereof engaged by the clasps B B' and the individual leaves are engaged with the jaws $c^7\ c^8$ of the turning-arm C, all of said arms being arranged upon the right side of the support. When it is desired to turn the leaf, the uppermost arm may be swung to the other side of the support by means of the finger-piece $c^3$.

I claim—

1. A music-leaf turner comprising a support, clasps arranged in vertical alinement on the support, said clasps comprising each a base provided with a longitudinal rib, plates pivoted eccentrically to each end of the base, each being provided with a rib coöperating with one end of the rib on the base, whereby to grip the folio, a spring arranged between the plates and acting to normally retain the ribs in contact, one of said clamps being provided with an extension having an angular portion, a plurality of turning-arms, each of said arms comprising a plate pivoted to the angular projection and provided with a finger-piece whereby to manipulate the same, a rod secured to the plate and projecting laterally from the clasp, and a leaf-clamp on the free end of the rod, said clamp comprising a plate secured to the free end of the rod and bent upon itself to form opposing jaws, one of said jaws having a concavity and the other a convexity fitting into the concavity whereby to securely grip the leaf.

2. A music-leaf turner, comprising a support, clasps arranged in vertical alinement on the support, said clasps comprising each a base provided with a longitudinal rib, plates pivoted eccentrically to each end of the base, each being provided with a rib coöperating with one end of the rib on the base, a spring between the plates, and acting to normally retain the ribs in contact with each other, one of said clasps being provided with an angular projection, and a plurality of turning-arms pivoted to said angular projection.

3. A music-leaf turner, comprising a support, clasps for engaging the back of the folio arranged in vertical alinement on the support, one of said clasps being provided with an angular projection, a plurality of turning-arms, each comprising a plate pivoted to the angular projection, and provided with a finger-piece, a rod secured to the plate and projecting laterally from the clasp, and a leaf-clamp on the end of the rod, said clamp comprising a plate secured to the free end of the rod and bent upon itself to form opposing jaws.

ERNEST R. ELDRIDGE.

Witnesses:
C. M. BEST,
E. A. ZOLLMER.